United States Patent
Brüstle et al.

[19]

[11] Patent Number: 5,807,013
[45] Date of Patent: Sep. 15, 1998

[54] CONNECTING FITTING

[75] Inventors: Klaus Brüstle; Erich Röck, both of Höchst, Austria

[73] Assignee: Julius Blum Gesellschaft m.b.H., Höchst, Austria

[21] Appl. No.: 699,441

[22] Filed: Aug. 19, 1996

[30] Foreign Application Priority Data

Aug. 21, 1995 [AT] Austria ................................. 1410/95

[51] Int. Cl.⁶ .................. F16B 9/02; F16B 12/20
[52] U.S. Cl. .................. 403/245; 403/231; 403/329; 403/330; 403/407.1
[58] Field of Search .................. 403/231, 230, 403/248, 246, 405.1, 406.1, 407.1, 321, 322, 325, 326, 329, 327, 330

[56] References Cited

U.S. PATENT DOCUMENTS

| | | | |
|---|---|---|---|
| 4,127,353 | 11/1978 | Busse | 403/245 |
| 4,553,873 | 11/1985 | Salice | 403/245 |
| 4,582,446 | 4/1986 | Salice | 403/245 |
| 4,697,946 | 10/1987 | Rock et al. | 403/230 X |
| 4,752,150 | 6/1988 | Salice | 403/231 X |
| 4,826,345 | 5/1989 | Salice | 403/245 X |

FOREIGN PATENT DOCUMENTS

| | | | |
|---|---|---|---|
| 2575794 | 7/1986 | France | 403/231 |
| 141702 | 5/1980 | Germany. | |
| 31 22 978 | 1/1983 | Germany. | |
| 31 27 795 | 2/1983 | Germany. | |
| 201 933 | 8/1983 | Germany. | |
| 1476214 | 4/1989 | U.S.S.R. | 403/407.1 |

*Primary Examiner*—Harry C. Kim
*Attorney, Agent, or Firm*—Wenderoth, Lind & Ponack

[57] ABSTRACT

A connecting fitting releasably connects two platelike furniture members. The connecting fitting comprises two connecting member which are adapted to be secured to respective ones of the furniture members. A first connecting member is pin-like and has a head and a shank, and the second connecting member is in the form of a casing with a cylindrical shell. A spring loaded locking member is situated within the casing. The casing has an opening in its cylindrical shell through which the head of the first connecting member is insertable. The locking member is adapted for releasably engaging the head of the pin-like connecting member when in the inserted position. A latch is situated in the casing to obstruct movement of the locking member biased by the spring. The latch is provided with a resilient abutment lever which the pin-like member strikes when it is inserted into the casing and by means of which the pin-like member moves the latch. The abutment lever gives way to the head of the pin-like connecting member when the latter is moved out of the casing.

17 Claims, 7 Drawing Sheets

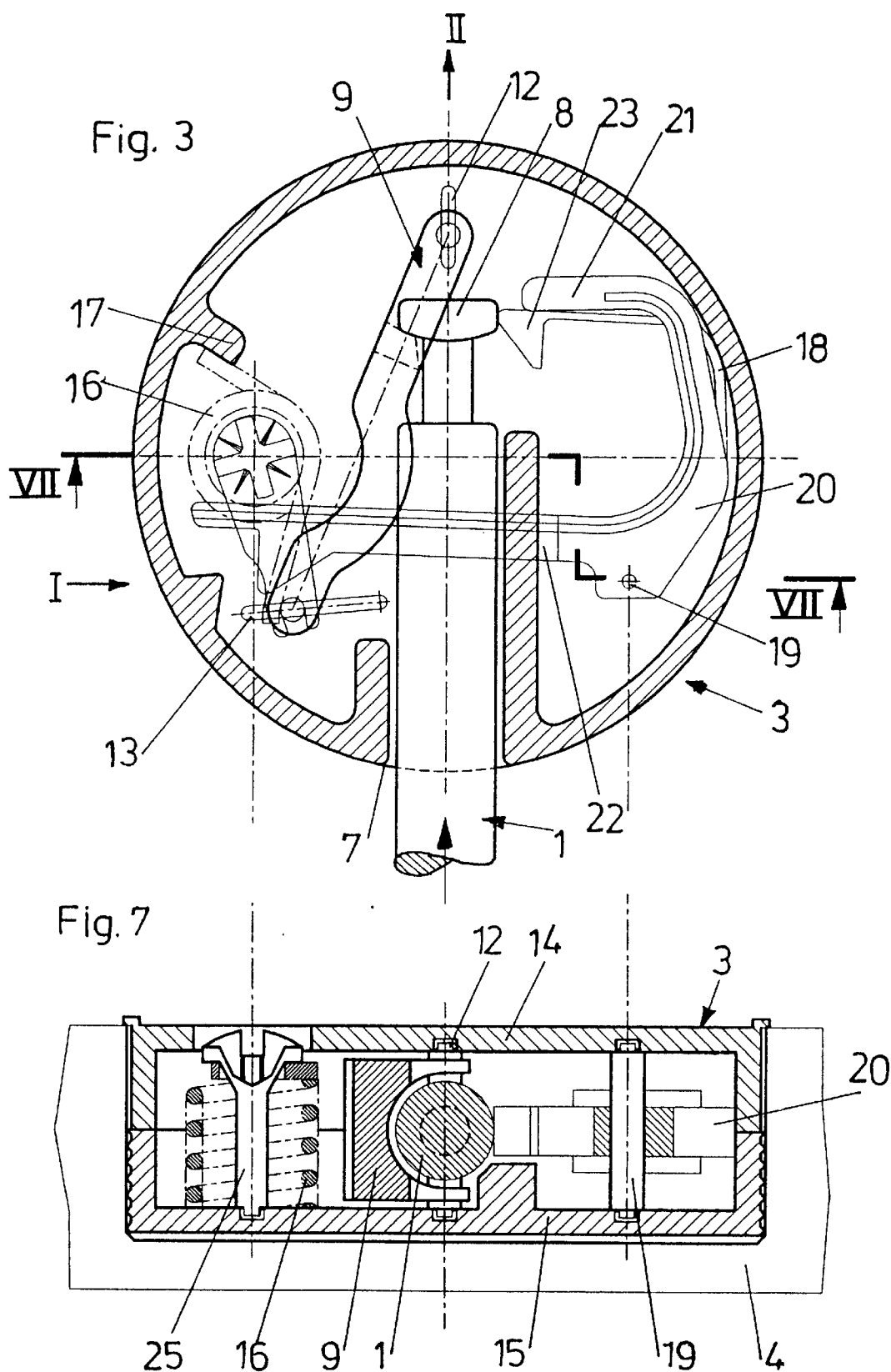

CONNECTING FITTING

BACKGROUND OF THE INVENTION

1. Field of the Invention

This invention relates to a connecting fitting for releasably connecting two furniture members, preferably two platelike furniture members. The connecting fitting includes two connecting members which are adapted to be secured to respective ones of the furniture members, a first connecting member being pin-like and having a head and a shank, and the second connecting member being in the form of a casing with a cylindrical shell in which a spring loaded locking member is situated and having an opening in its cylindrical shell through which the head of the first connecting member is insertable into the casing. The locking member is adapted to releasably engage the head of the pin-like connecting member when in the inserted position, a latch being situated in the casing to obstruct movement of the locking member biased by the spring.

2. Description of the Prior Art

Austrian Patent 390 480 describes a connecting fitting with a pin-like connection member adapted to be fastened in a first furniture part and a rotary wedge adapted to be situated in a bore in a second furniture part. When the two furniture parts abut each other the pin-like connecting member extends with its head into the bore in the second furniture part. By turning the rotary wedge by means of a screw driver the wedge is interlocked with the head of the pin-like connecting member and pulls this connecting member further into the bore.

U.S. Pat. No. 4,582,446 describes a connecting fitting with a pin-like connecting member adapted to be fastened in a first furniture part and a connecting member in the form of a dowel casing adapted to be secured within a bore in the second furniture part. A rotary wedge which is biased by a spring is situated in the dowel casing. When the pin-like connecting member is inserted into a receiving opening in the dowel casing it is interlocked with the rotary wedge. The rotary wedge is rotated by the spring and thereby pulls the pin-like connecting member further into the dowel casing. A handle lever is provided, by means of which the rotary wedge can be moved in a retracting sense. Means for locking the rotary wedge in its retracted position are also provided. When the rotary wedge is in its retracted position the handle lever also has to be retracted so that the rotary wedge can respond to the insertion of the pin-like connecting member.

SUMMARY OF THE INVENTION

It is an object of the present invention to provide an improved connecting fitting of the afore described kind so that after retraction of a locking member to release a pin-like connecting member no further action is necessary to bring the locking member into operating condition.

According to the invention this object is accomplished in that a latch is provided with a resilient abutment lever which the pin-like member strikes when it is inserted into the casing and by means of which the pin-like member moves the latch and which gives way to the head of the pin-like connecting member when the latter is moved out of the casing.

By means of the improved connecting fitting two furniture walls can be connected to each other without the employment of a tool. A tool is necessary for separating the furniture walls but after that the connecting members of the connecting fitting are in operating condition without further manipulation.

BRIEF DESCRIPTION OF THE DRAWINGS

FIG. 3 is a sectional view of the casing whereby the pin-like member is shown being held by a locking member, FIG. 7 is a sectional view taken on line VII—VII of FIG. 3.

DESCRIPTION OF THE PREFERRED EMBODIMENT

Figure 1:
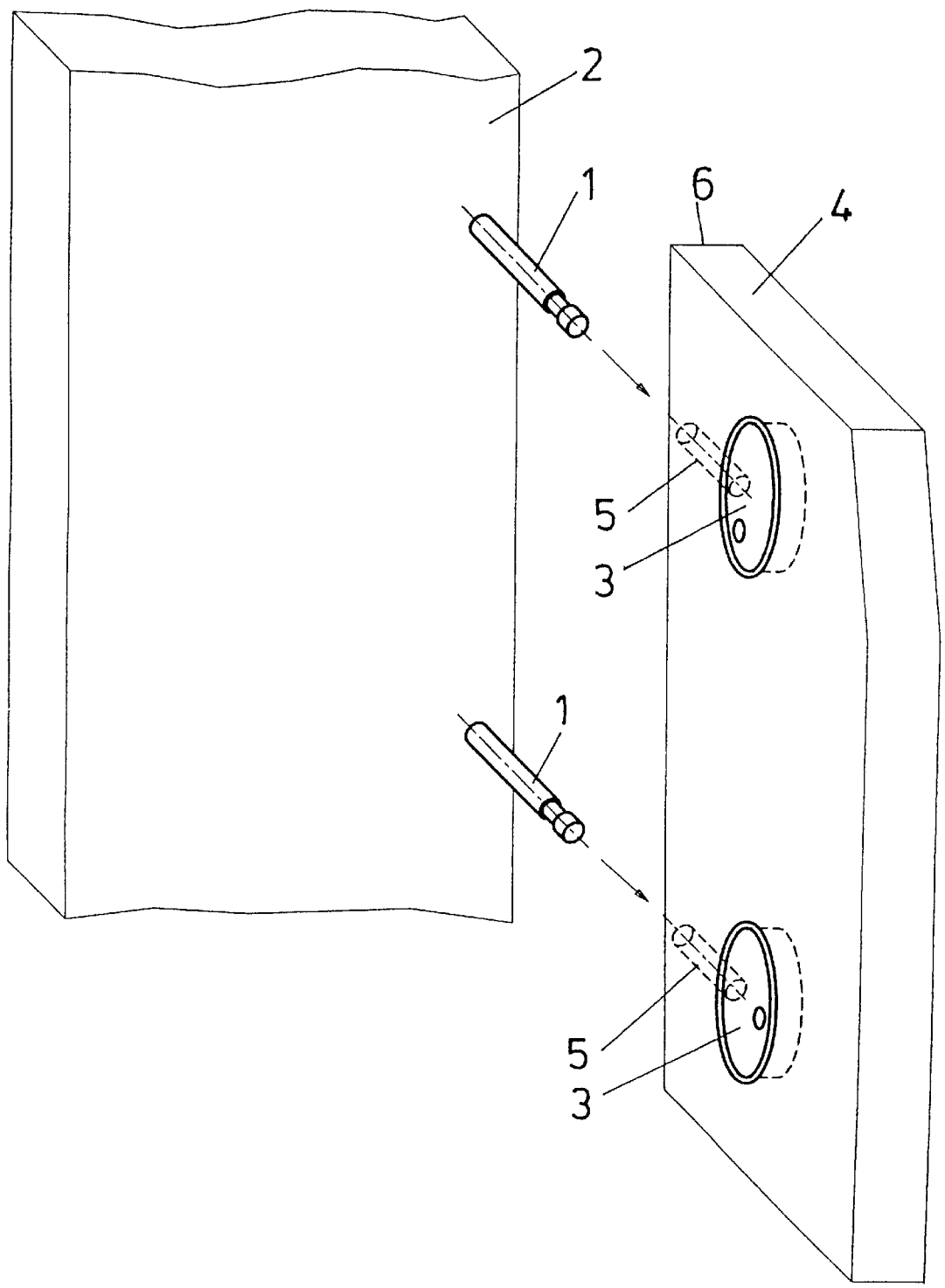
FIG. 1 is a perspective view of two furniture parts and a connecting fitting according to the invention.

As shown in FIG. 1 pin-like connecting members 1 are fastened to a plate-like furniture member 2 and casings 3 are inserted in milled bores in another plate-like furniture member 4. The pin-like connecting member 1 may for example be held by means of dowels in the furniture member 2. In the furniture member 4 bores 5 are provided which extend from the front face 6 of the furniture member 4 into the milled bores where the casings 3 are situated. Each casing 3 is provided with an opening 7 in its shell through which the pin-like connecting member 1 can be inserted into the casing 3.

The pin-like connecting member 1 is at its free end provided with a head 8 which when the pin-like connecting member 1 is inserted into the casing 3 is held by a locking member 9 situated within the casing 3.

Figure 10:
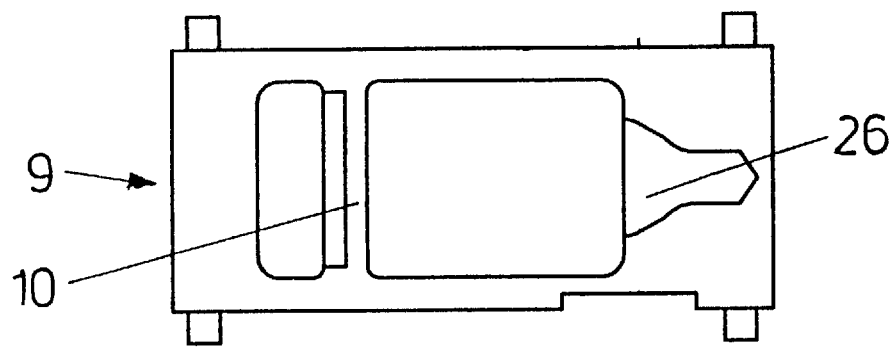
FIG. 10 is a plan view of the locking member.
Figure 11:
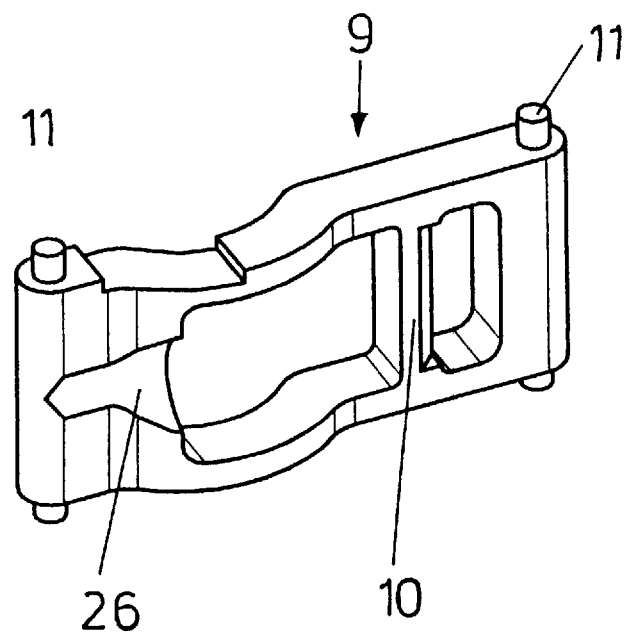
FIG. 11 is a perspective view of the locking member.
Figure 12:
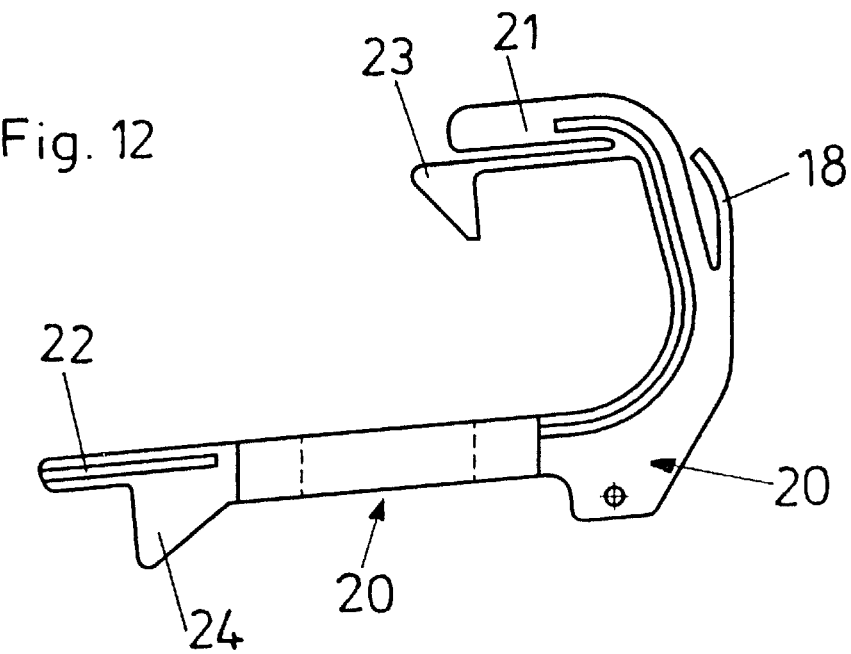
FIG. 12 is a side elevation of a latch.
Figure 13:
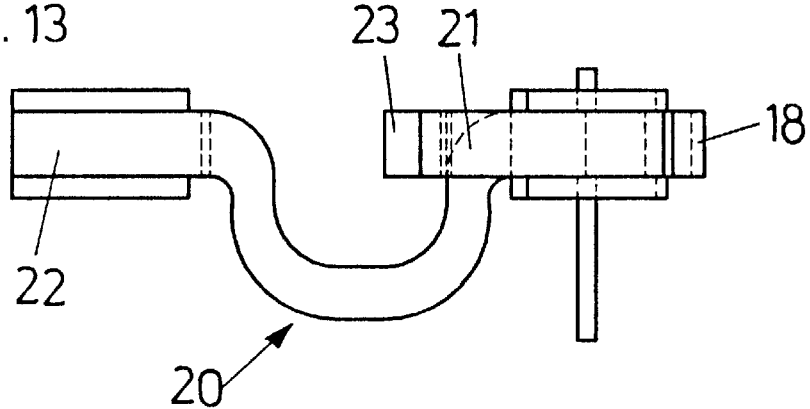
FIG. 13 is a plan view of the latch.
Figure 14:
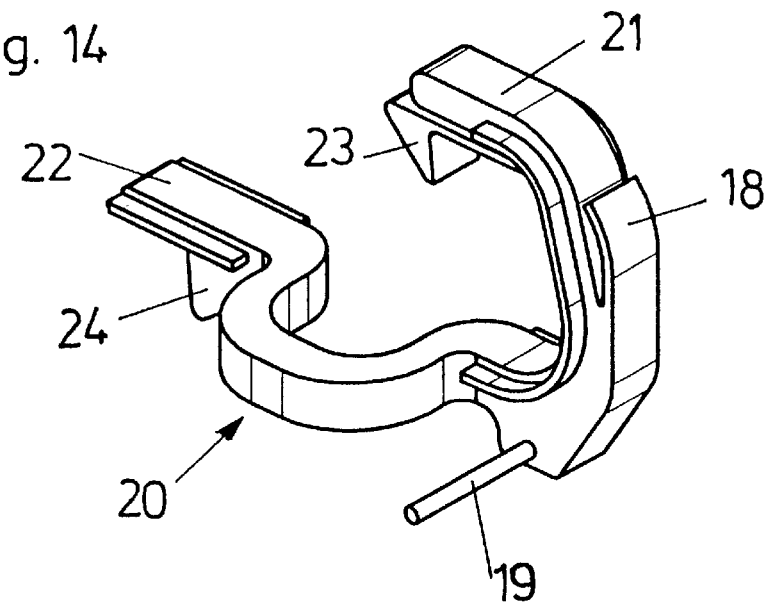
FIG. 14 is a perspective view of the latch.

As shown in FIGS. 10 and 11 the locking member 9 has the shape of a rectangular frame having a cross member 10 which in locking position abuts the head 8 of the pin-like connecting member 1. The locking member 9 is at its two ends guided in grooves by means of pegs 11. The grooves form linear guideways 12, 13 in the casing 3. One guideway 12 is positioned in front of the front end of the pin-like connecting member 1 and is situated on the longitudinal axis of the pin-like connecting member 1. The second guideway 13 is situated at the other end of the locking member 9 and is aligned approximately at an angle of 90° to the first guideway 12. Conveniently the grooves defining the guideways 12, 13 are provided on both walls of the casing 3 so that the locking member 9 is on both sides guided in such grooves. The guideway 13 is not aligned in exactly a right angle to the pin-like connecting member 1 but is slightly inclined.

The locking member 9 is at its end that is situated next to the guideway 13 acted upon by a locking spring 16 which pushes the locking member 9 toward its locking position. The spring 16 is a leg spring and with one leg abuts a projection 17 at the inside wall of the shell of the casing 3.

A latch 20 is provided in the casing 3 and which holds the locking member 9 in its non-locking position. The latch 20 is mounted on an axle 19 in the casing 3. A latching spring 18 is formed on the latch 20 and abuts the inner wall of the casing 3 and in this way pushes the latch 20 to its latching position.

The latch 20 is U-sphaped with a shorter leg 21 and a longer leg 22. A resilient abutment lever 23 is positioned at the shorter leg 21. The latch 20 with legs 21 and 22, the spring 18 and the abutment member 23 are preferably an integral, one-piece part made of plastic material.

When the pin-like connecting member 1 is inserted into the casing 3 the head 8 of the connecting member 1 pushes the abutment member 23 onto the leg 21 of the latch 20.

A cam 24 is provided on the longer leg 22 of the latch 20. In the position shown in FIG. 2 the cam 24 holds the locking member 9 in its not-locking position and prevents movement of the locking member 9 due to the action of spring 16. A swivel 25 is provided within the coil of the spring 16 by means of which the spring 16 can be tensioned with a screw driver.

Before the pin-like connecting member 1 is inserted into the casing 3 the locking member 9 abuts to cam 24 of the latch 20. The latch 20 and the locking member 9 are in the position shown in FIG. 2.

When the pin-like connecting member 1 is inserted into the opening 7 and into the casing 3 the head 8 of the connecting member 1 abuts the abutment lever 23 and presses the abutment lever 23 onto the leg 21 of the latch 20. By this action the latch 20 is pivoted on axle 19. By this pivot movement the cam 24 is moved away from stop 26 on the locking member 9 and the locking member 9 is moved in the direction of arrows I, II of FIGS. 2 and 3 by means of the spring 16.

Figure 2:
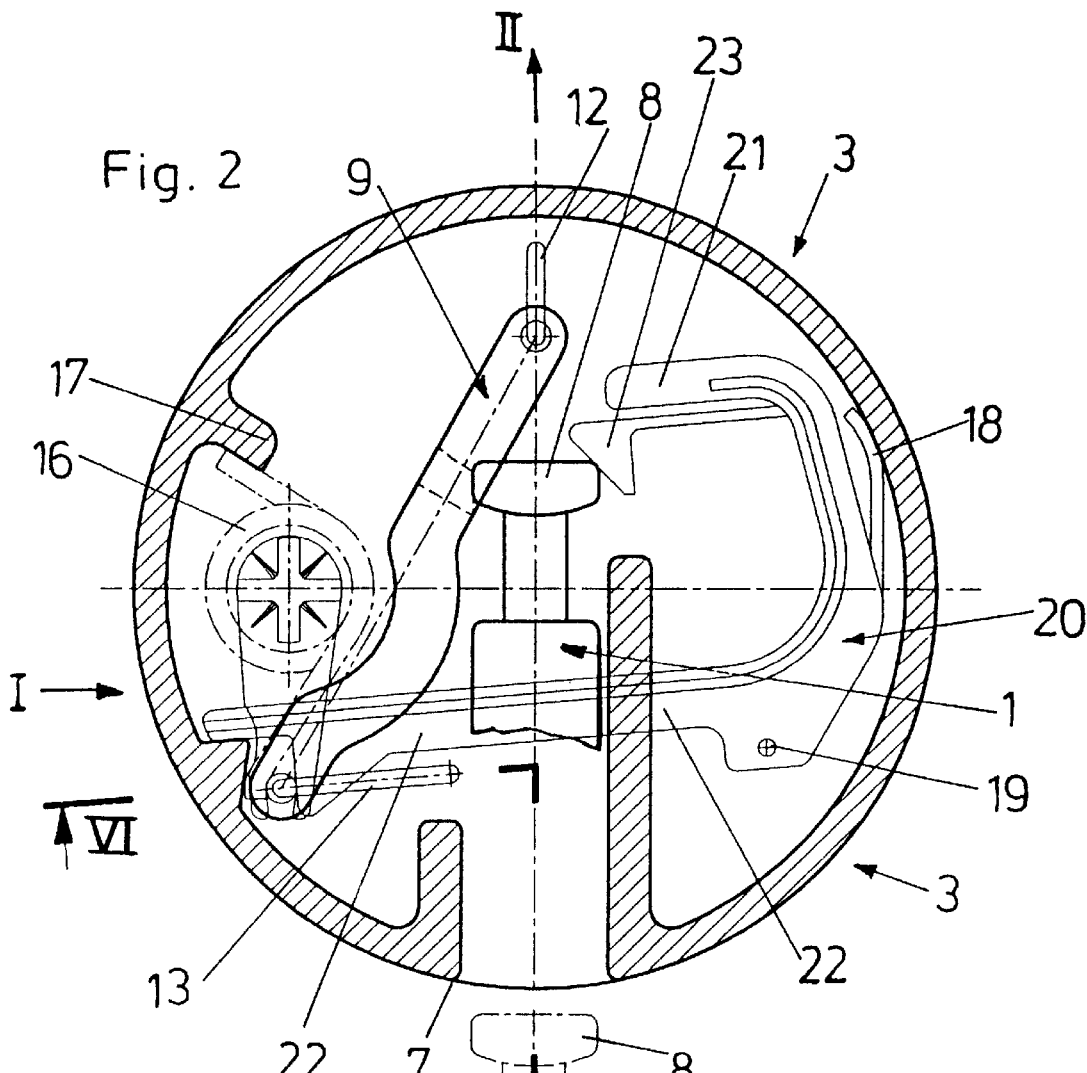
FIG. 2 is a sectional view of a casing forming one connecting member, i.e. a pin-like connecting member shown as being moved into the casing.
Figure 6:
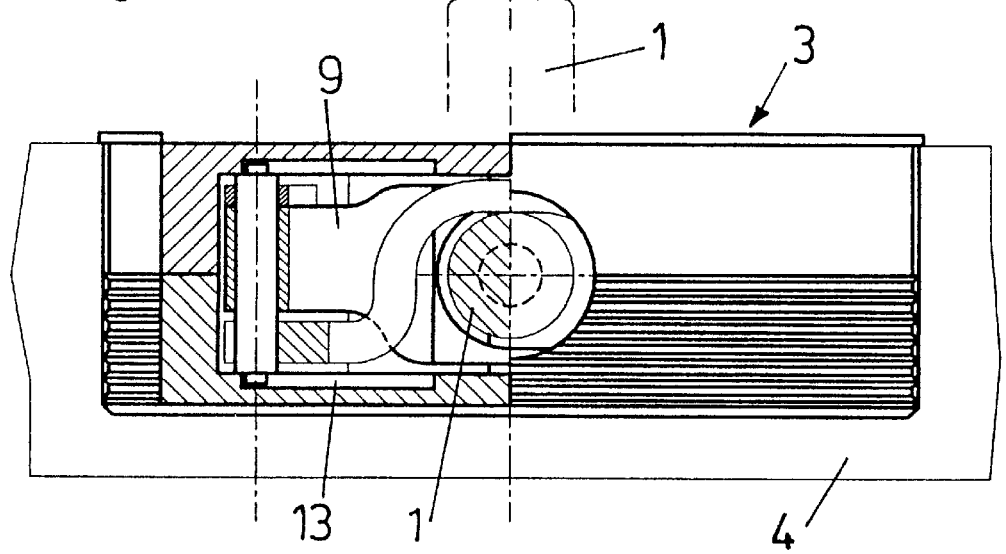
FIG. 6 is a sectional view taken on line VI—VI of FIG. 2.
Figure 4:
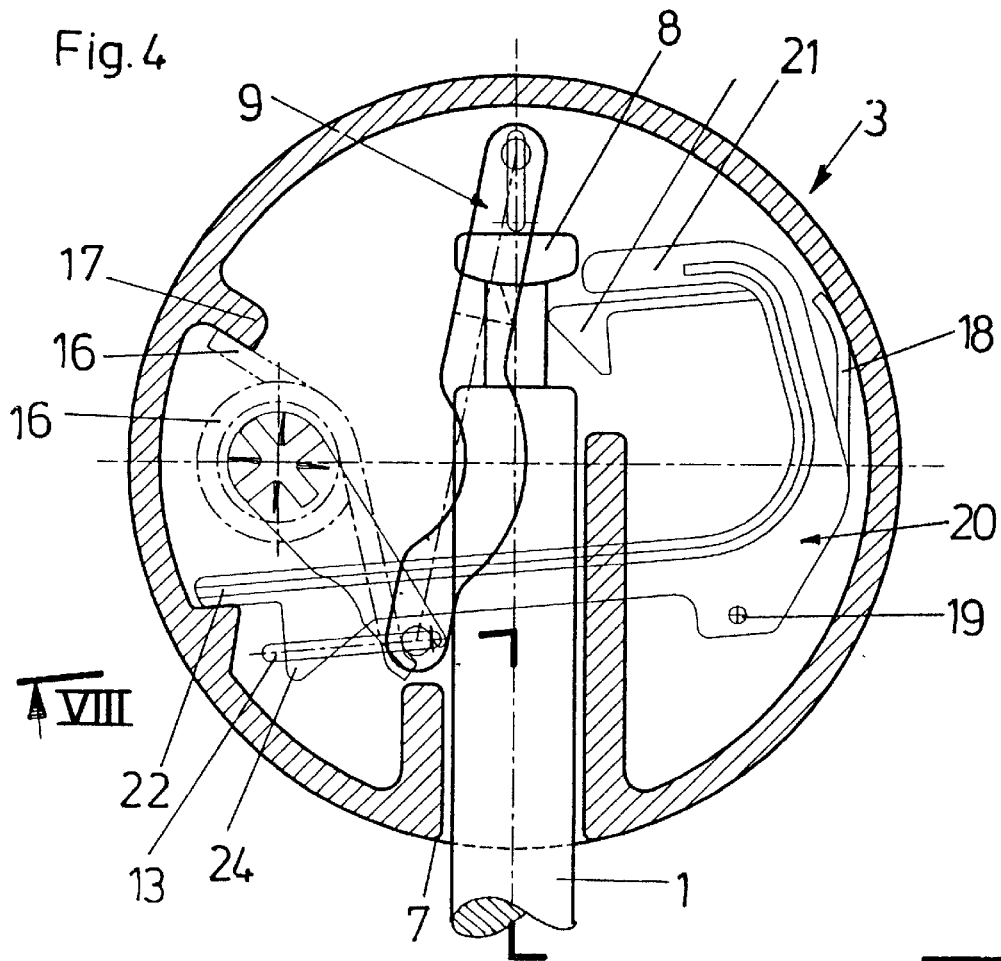
FIG. 4 is a sectional view of the casing whereby the pin-like member is shown in its fully locked position.
Figure 8:
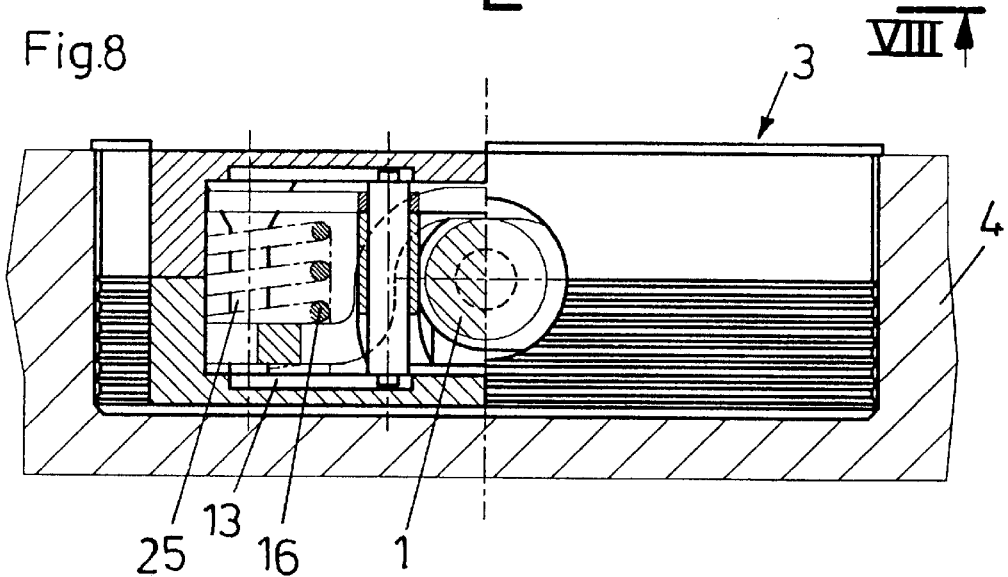
FIG. 8 is a sectional view taken on line VIII—VIII of FIG. 4.

Because of the guideways 12, 13 the locking member 9 is moved not only in the direction of the connecting member 1 but also in the direction of the arrow II shown in FIGS. 2 and 3. As the locking member 9 holds the head 8 of the connecting member 1 by means of the cross part 10 the connecting member 1 is pulled further into the casing 3. The force by which the connecting member 1 is pulled into the casing 3 is carried out by the spring 16.

To release the connecting member 1 from its hold in the casing 3 the spring 16 is tensioned by means of a screw driver and thereby the force of the spring 16 is taken away from the locking member 9. Advantageously the connecting member 1 is moved a short way in the direction out of the casing 3. In the illustrated embodiment the locking member 9 is connected to the swivel 25 by means of an arm 27. When the locking member 9 is in the position shown in FIG. 5 the cam 24 engages the locking member 9. In this position the connecting member 1 can be moved out of the casing 3 whereby the abutment lever 23 gives way to the head 8 of the connecting member 1.

Figure 5:
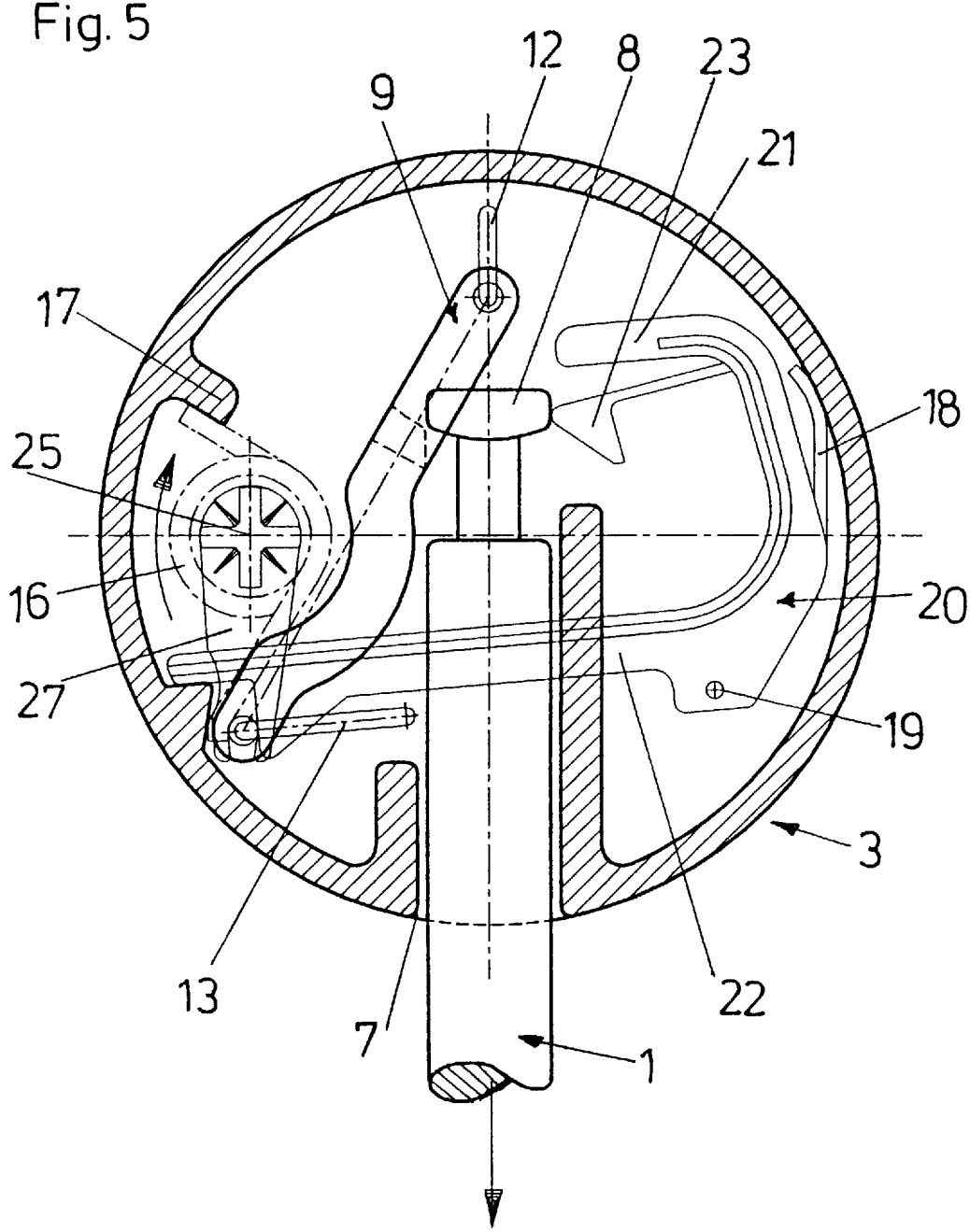
FIG. 5 is a sectional view of the casing showing the pin-like member as being released.
Figure 9:
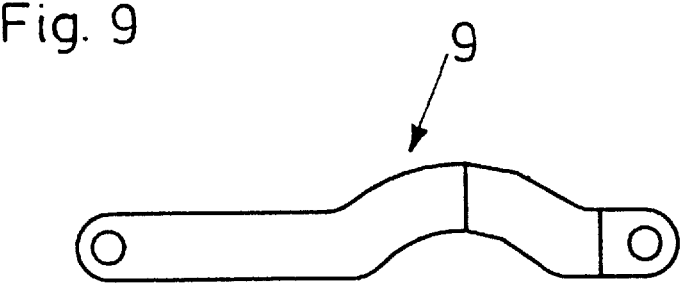
FIG. 9 is a side elevation of the locking member.

It is an essential feature of the invention that the connecting member 1 can remain within the casing 3 after the locking member 9 has been moved out of its locking position and into the position shown in FIG. 5 of the drawings. As the locking member 9 is held in this position by means of the cam 24 of the latch 20 it cannot be moved into the locking position by the spring 16.

Because of this arrangement it is possible to release the connecting members 1 of a plurality of connecting fittings distributed over the height of the piece of furniture one after the other and then remove the furniture part 2 with the connecting members 1 from the furniture part 4.

We claim:

1. A connecting fitting for connecting two furniture members, said connecting fitting comprising:
    a pin-like first connecting member adapted to be secured to one furniture member and including a shank and a head;
    a second connecting member in the form of a casing having a cylindrical shell adapted to be secured to the other furniture member, said cylindrical shell having therein an opening through which is insertable said head of said first connecting member;
    a locking member within said casing and biased by a locking spring to releasably engage said head of said first connecting member in an inserted position thereof;
    a latch within said casing and having a latching position whereat said latch is operable to obstruct movement of said locking member biased by said locking spring;
    a latching spring positioned to bias said latch to said latching position thereof; and
    said latch having a resilient abutment lever positioned to be abutted by said head upon insertion of said first connecting member into said opening, thereby to move said latch from said latching position thereof, said resilient abutment lever being sufficiently resilient to deflect and give way to said head and return from such deflection upon withdrawal of said first connecting member from said opening.

2. A connecting fitting as claimed in claim 1, wherein said latching spring is integral with said latch.

3. A connecting fitting as claimed in claim 1, wherein said latch is pivotable about an axle that is fixed relative to said casing.

4. A connecting fitting as claimed in claim 1, wherein said latch has a stop cam operable to obstruct movement of said locking member under bias by said locking spring.

5. A connecting fitting as claimed in claim 4, wherein said latch has a U-shaped configuration including a shorter leg and a longer leg.

6. A connecting fitting as claimed in claim 5, wherein said resilient abutment lever is located to abut said shorter leg, and said stop cam is on said longer leg.

7. A connecting fitting as claimed in claim 1, wherein said locking member is oblong and has opposite ends guided in respective guideways in said casing.

8. A connecting fitting as claimed in claim 7, wherein said guideways are rectilinear.

9. A connecting fitting as claimed in claim 7, wherein said guideways together define an angle of approximately 90°, and one of said guideways extends parallel to a longitudinal axis of said first connecting member.

10. A connecting fitting as claimed in claim 1, further comprising a swivel member mounted in said casing and operable to tighten said locking spring and to unlock said locking member.

11. A connecting fitting as claimed in claim 1, wherein said locking spring comprises a leg spring.

12. A connecting fitting as claimed in claim 1, wherein said locking member comprises an oblong frame having a cross member operable to lock said first connecting member in said inserted position thereof.

13. A connecting fitting as claimed in claim 1, wherein said locking member is operable, upon said first connecting member being inserted into said casing, to pull said first connecting member further into said casing under bias from said locking spring.

14. A connecting fitting as claimed in claim 13, wherein said resilient abutment lever is operable to be moved by said head of said first connecting member into abutment with said latch and to move said latch from said latching position thereof obstructing movement of said locking member under bias from said locking spring to a non-latching position allowing said locking spring to bias said locking member to pull said first connecting member further into said casing.

15. A connecting fitting as claimed in claim 1, wherein said opening in said cylindrical shell is enclosed peripherally of said opening by said cylindrical shell.

16. A connecting fitting as claimed in claim 1, wherein said opening extends through said cylindrical shell in a direction radially thereof.

17. A connecting fitting as claimed in claim 1, wherein said opening has an axis extending orthogonal to a central axis of said cylindrical shell.

* * * * *